US009850065B2

(12) United States Patent
Decker

(10) Patent No.: US 9,850,065 B2
(45) Date of Patent: Dec. 26, 2017

(54) SYSTEM FOR SECURING A REFUSE CONTAINER

(71) Applicant: Eric Decker, Toronto (CA)

(72) Inventor: Eric Decker, Toronto (CA)

( * ) Notice: Subject to any disclaimer, the term of this patent is extended or adjusted under 35 U.S.C. 154(b) by 0 days.

(21) Appl. No.: 15/011,464

(22) Filed: Jan. 29, 2016

(65) Prior Publication Data

US 2017/0217677 A1 Aug. 3, 2017

(51) Int. Cl.
*B65F 1/14* (2006.01)
*F16M 11/00* (2006.01)
*B65F 1/16* (2006.01)

(52) U.S. Cl.
CPC ............ *B65F 1/1426* (2013.01); *B65F 1/141* (2013.01); *B65F 1/1615* (2013.01); *F16M 11/00* (2013.01); *B65F 2001/1669* (2013.01)

(58) Field of Classification Search
CPC ...... B65F 1/141; B65F 1/1426; B65F 1/0006; B65F 1/0013; B65F 1/002; B65F 1/1452; B65F 1/1006; B65F 1/1623; B65F 1/1646; B65F 1/1415; B65F 1/1421; B65F 2001/1669; A47B 81/00; F16M 11/00; E05D 13/006; E05D 15/28; E05F 1/10; E05F 1/1066; E05F 1/1075; E05F 1/1276; B65B 2067/1261; B65B 67/12; B65B 67/1216; B65B 67/1233; B65B 67/1227; B65B 67/1205
USPC ............... 248/95, 97–101, 147, 200, 231.91, 248/247–250
See application file for complete search history.

(56) References Cited

U.S. PATENT DOCUMENTS 1,548,986 A * 8/1925 Donovan ................ B65B 67/12 248/99
2,233,796 A * 3/1941 Pines .................... B65F 1/1436 100/229 A
2,690,893 A * 10/1954 Mokhiber ............... B65F 1/141 248/124.2
2,862,683 A * 12/1958 Dunagan ................. B65F 1/141 248/147
3,064,931 A * 11/1962 Rowe .................... B65F 1/1421 220/262
3,257,090 A * 6/1966 Frazier ................ B65B 67/1227 248/99
3,270,993 A * 9/1966 Montague ............... B65F 1/141 248/147
3,476,341 A * 11/1969 Patterson ................. B60N 3/08 224/558
3,561,710 A * 2/1971 Cummings ............. B65F 1/141 211/83
3,802,620 A * 4/1974 Ferrara .................. A47G 29/12 232/19

(Continued)

*Primary Examiner* — Nkeisha Smith
(74) *Attorney, Agent, or Firm* — Aird & McBurney LP

(57) ABSTRACT

A retaining system for maintaining a refuse container in a substantially upright position, said retaining system comprising: a retaining device for removably receiving a handle bar of said container, said retaining device fixedly attached to a rigid mount; a platform for receiving a base of said container and elevating said container above a support surface; an enclosure disposed around said container, said enclosure having an enclosure opening to facilitate depositing of said refuse into said container and removal of said container from said retaining device and said enclosure, and placement of said container in said enclosure.

18 Claims, 7 Drawing Sheets

(56) References Cited

U.S. PATENT DOCUMENTS

| | | | | | |
|---|---|---|---|---|---|
| 3,876,124 | A * | 4/1975 | Avery | A45C 11/005 | 206/5.1 |
| 4,655,357 | A * | 4/1987 | Hampton, Jr. | A01K 1/03 | 220/1.5 |
| 6,691,959 | B1 * | 2/2004 | Dancy | B65B 67/1205 | 248/100 |
| 6,863,249 | B1 * | 3/2005 | Alvord | B60R 9/02 | 248/208 |
| 8,074,824 | B1 * | 12/2011 | Roby-Wilson | B65B 67/1222 | 220/23.86 |
| 9,284,117 | B2 * | 3/2016 | Guild | B65F 1/1623 | |
| 2009/0250463 | A1 * | 10/2009 | Van Risseghem | B65F 1/163 | 220/263 |
| 2010/0012793 | A1 * | 1/2010 | Sung | B65F 1/1426 | 248/99 |
| 2013/0002100 | A1 * | 1/2013 | Badri | B65F 1/1426 | 312/212 |
| 2014/0265772 | A1 * | 9/2014 | Newman | A47B 81/005 | 312/237 |
| 2015/0344224 | A1 * | 12/2015 | Brokaw | B65F 1/16 | 280/47.17 |
| 2016/0052714 | A1 * | 2/2016 | McDade | B65F 1/1615 | 220/326 |

* cited by examiner

SYSTEM FOR SECURING A REFUSE CONTAINER

FIELD OF THE INVENTION

The present invention relates to refuse containers, and more particularly it relates to securing a refuse container to counter forces intended to tip it over.

DESCRIPTION OF THE RELATED ART

Garbage containers, such as green bins, are placed outdoors for health or sanitary reasons and to prevent odour from fouling up the indoor living space. In addition, garbage containers are not aesthetically pleasing, unsightly, and do not typically fit in with the decor of most interior spaces. It is a well-known problem that garbage or food containers left outdoors are prone to getting accessed, or knocked over, by domestic and wild animals, such as raccoons and bears, in search of food.

In the event that a garbage container is knocked over by animals, or wind, the container lid is forced open and the animals rummage through the container in search of food, resulting in the contents of the container being strewn in the vicinity of the container, or all over the porch, yard, driveway, or street curb. Exposed contents provide a breeding ground for maggots and flies, and also attract vermin, such as mice and rats, leading to increased populations of same. Accordingly, one is compelled to expeditiously gather the unsightly, and often foul-smelling strewn waste material and redeposit it in the container, which can be a time-consuming and frustrating exercise, and not one without embarrassment.

Numerous prior art solutions have been proposed to address the above-noted problem, however these proposals have been primarily directed towards providing containers with lids that can not be opened by animals, especially raccoons. These prior art proposals include complicated locking and latching mechanisms, spring-loaded devices, bungee cords, and rocks or other heavy objects placed on top of the lids, and so forth. However, most of these approaches are easily defeated by raccoons which readily tip the container over, forcing the lid off the container. In addition to being ineffective, spring-loaded devices and bungee cords can be relatively difficult to operate, especially for the elderly, and can be hazardous. Placing rocks and other heavy objects on the lid, in order to weigh the lid down, requires considerable strength and dexterity, and is fraught with accidents. Such proposals also present a problem to the sanitation personnel who have to decipher how these prior art solutions function in order to open the lid for waste disposal.

It is an object of the present invention to mitigate or obviate at least one of the above-mentioned disadvantages.

SUMMARY OF THE INVENTION

In one of its aspects, there is provided an enclosure for a container, said container having a substantially rectangular walled body having a front wall facing a back wall, and joined together by opposed body side walls and a base to define an interior volume with a body opening for input of refuse into said interior volume; said body having handle supports and a handle bar extending therebetween and integrally formed therewith; a lid associated with said opening and operable between a closed position and open position, and is pivotably attached to said handle bar via hinge means for access to said interior volume, said having a recessed lid handle engageable by a user's hands to provide a lifting force to said lid to swing open said lid about said hinge means, and place said lid in said open position, said enclosure comprising:

- a back wall, opposed enclosure side walls having a top end and a bottom end, and a top wall to collectively define an enclosure opening opposite said back wall;
- a platform disposed between said top end and said bottom end, said platform for elevating and supporting said container;
- a retainer member secured to said back wall, said retainer member comprising a unitary frame having a flat, elongate mounting plate with a first longitudinal axis in a vertical plane, with an angled segment extending downwardly therefrom with a second longitudinal axis oblique to said first longitudinal axis, a U-shaped segment comprising a first arm with a third longitudinal axis substantially parallel to said first longitudinal axis of said mounting plate, an arcuate portion joining said first arm to a second arm extending upwardly towards said first arm with a fourth longitudinal axis oblique to said third longitudinal axis, whereby an enclosure opening is defined between said first arm, arcuate portion and said second arm, and said enclosure opening is dimensioned to receive said handle bar associated with said container; a tether having a hook member at one end and other end secured on said mounting plate, said hook member being removably attached to said lid to maintain said lid in an angled open position;

whereby said handle bar is placed within said U-shaped segment and in close proximity to said arcuate portion, and said base engages and rests on said platform to co-operatively resist a force is applied to said body intended to topple said container, and maintain said container in a substantially upright position.

In another of its aspects, there is provided a retaining device for use with a container, said retaining device comprising:

- a unitary frame having:
  - a flat, elongate mounting plate with a first longitudinal axis in a vertical plane, with an angled segment extending downwardly therefrom,
  - a U-shaped segment with a first arm in a plane substantially parallel to said vertical plane of said mounting segment,
  - an arcuate portion joining first arm to a second arm extending upwardly towards said first arm, whereby an opening is defined between said first arm, arcuate portion and said second arm, and said opening is dimensioned to receive a handle bar associated with said container, said handle bar disposed between a pair of handle supports integrally formed with said container;
  - a tether having a hook member at one end and other end secured on said mounting plate, said hook member being removably attached to a lid hingedly connected to said container to adapt said lid between an angled open position and a closed position; and
- whereby said mounting plate is fixedly attached to a rigid mount.

In yet another of its aspects, there is provided a retaining system for maintaining a refuse container in a substantially upright position, said retaining system comprising:

- a retaining device for removably receiving a handle bar of said container, said retaining device fixedly attached to a rigid mount;

a platform for receiving a base of said container and elevating said container above a support surface;

an enclosure disposed around said container, said enclosure having an enclosure opening to facilitate depositing of said refuse into said container and removal of said container from said retaining device and said enclosure, and placement of said container in said enclosure.

Advantageously, the container is maintained in a generally upright position by the retaining device co-operating with the surface that the container rests on. Positioning the container on an elevated platform at a predetermined height foils the way raccoons operate to tip over a container, since the lid or opening of the container is placed beyond the reach of a raccoon. Typically, raccoons rear up on their hind legs, or climb on each other, and use their body weight to tip over the bin and thereby popping open the lid. The height of the platform above the ground is also selected to allow a user to open and close the container lid, or lift the container, in a substantially upright posture. In addition, the device and platform do not include any moving parts, or resiliently biased elements, such as springs or bungee cords, that can cause injury, or parts that require replacement. In addition, no modification to the container is required in order for operation of the container retaining system, unlike some prior art proposals.

BRIEF DESCRIPTION OF THE DRAWINGS

Several exemplary embodiments of the present invention will now be described, by way of example only, with reference to the appended drawings in which.

DETAILED DESCRIPTION OF EXEMPLARY EMBODIMENTS

Figure 1A:
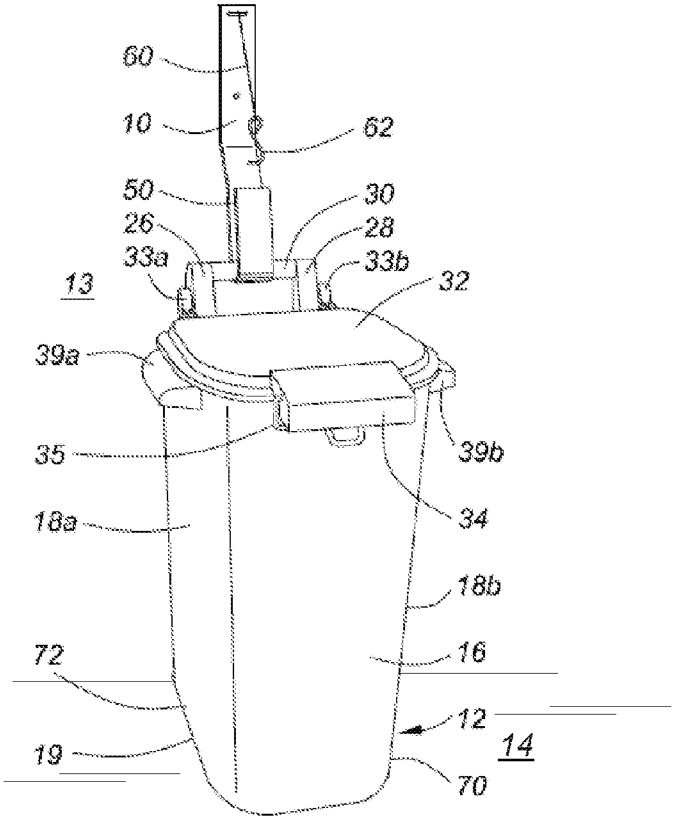
FIG. 1*a* is a perspective view of a retaining device in use with a container.

Looking at FIGS. 1*a*, 1*b*, 1*c* and 1*d*, there is shown a retaining device generally designated by the numeral 10, in an exemplary embodiment, for use with a refuse container 12, such as a green bin, used to contain biodegradable waste or compostable materials as a means to divert waste from landfills. In some localities green bins are also used to contain unsorted municipal waste. Retaining device 10 is fixedly secured to a substantially vertical, rigid structure 13, such as a brick or masonry wall, siding or post, by fastening means, including but not limited to, screws, rivets, nails, bolts, nuts and bolts, anchors, clamps, and welding. Device 10 maintains refuse container 12 in a substantially upright position while resting on a substantially horizontal support surface 14, such as the ground, and placed adjacent to rigid structure 13.

Figure 1B:
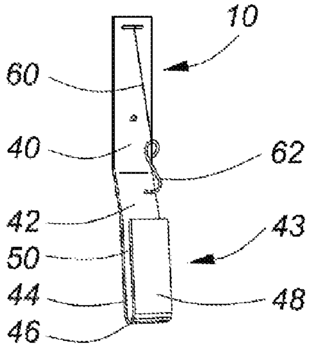
FIG. 1*b* is a perspective view of the retaining device.
Figure 1C:
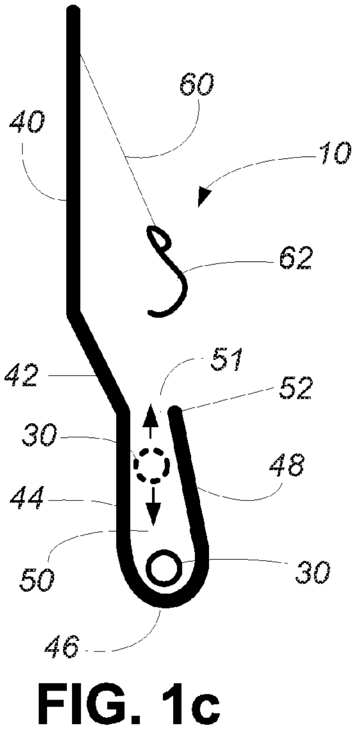
FIG. 1*c* is a side view of the retaining device.

Now looking at FIG. 1*c*, container 12 comprises a substantially rectangular walled body 16 having front wall 17*a* facing back wall 17*b*, and joined together by opposed body side walls 18*a*, 18*b*, and base 19, to define interior volume 20 with body opening 22 for input of refuse 24 into interior volume 20. Container 12 may be formed from thermoplastic material, such as, polyethylene, polypropylene, acrylonitrile butadiene styrene (ABS), polyvinyl chloride (PVC), nylon, and the like. In addition, body 16 includes handle supports 26, 28 and a substantially cylindrical handle bar 30, integrally formed therewith. Wheels 31 (not shown) are rotatably attached to an axle affixed to base 19 to enable maneuvering, as needed, such as to facilitate transporting container 12 to and from the curb. Lid 32 is pivotably attached to handle supports 26, 28 via hinge means 33*a*, 33*b* for access to interior volume 20 for placing refuse 24 therein, or to remove refuse 24 therefrom for disposal. In a closed position, lid 32 rests on body opening 22. Lid 32 includes recessed lid handle 34 engageable by a user's hands to provide a lifting force to lid 32 and swing open lid 32 about hinge means 33*a*, 33*b*. Container 12 also includes locking mechanism 35 for securing lid 32 to body 16 when lid 32 is in a closed position, thereby protecting the contents 24 of container 12 from animal intruders, as well as inclement weather conditions. An exemplary locking mechanism 35 includes latch mechanism 36 on lid 32 and catch member 38 on body 16. Latch mechanism 36 is actuable by a user to lock and unlock lid 32 to and from body 16, respectively. Each of opposed body side walls 18*a*, 18*b* includes auxiliary handles 39*a*, 39*b* integrally formed therewith, such that container 12 may be picked by a user for placement on retaining device 10 or removal therefrom, as well as for transportation.

As can be seen in FIG. 1*c*, handle bar 30 of container 12 is removably attached to retaining device 10. Generally, retaining device 10 comprises a unitary frame with a flat, elongate mounting plate 40 having a longitudinal axis in a vertical plane, with angled segment 42 extending downwardly therefrom, U-shaped segment 43 with first arm 44 with a longitudinal axis substantially parallel to the longitudinal axis of mounting plate 40, and arcuate portion 46 joining first arm 44 to second arm 48 extending upwardly and angled towards first arm 44. As such, angled second arm 48 has a longitudinal axis that is oblique to the longitudinal axis of first arm 44. Channel 50 is defined between first arm 44, arcuate portion 46 and angled second arm 48, and channel 50 is dimensioned to receive handle bar 30. As shown in FIGS. 1*b* and 1*c*, channel 50 has a transverse opening 51 dimensioned to fit handle bar 30, and therefore the distance between a top edge 52 of angled second arm 48 and first arm 44 is slightly larger than the diameter of the substantially cylindrical handle bar 30. The width of the unitary frame is dimensioned such that it is slightly smaller than the distance separating handle supports 26 and 28. Accordingly, handle bar 30 is received in channel 50, and abuts or is in close proximity with arcuate portion 46, and edges 53, 54 of arcuate portion 46 face handle supports 26 and 28, respectively. Phantom lines in FIG. 1*c* illustrate the position assumed by handle bar 30 as it travels in and out of channel 50, when securing container 12 to retaining device 10, and when removing container 12 from retaining device 10, respectively.

Figure 4:
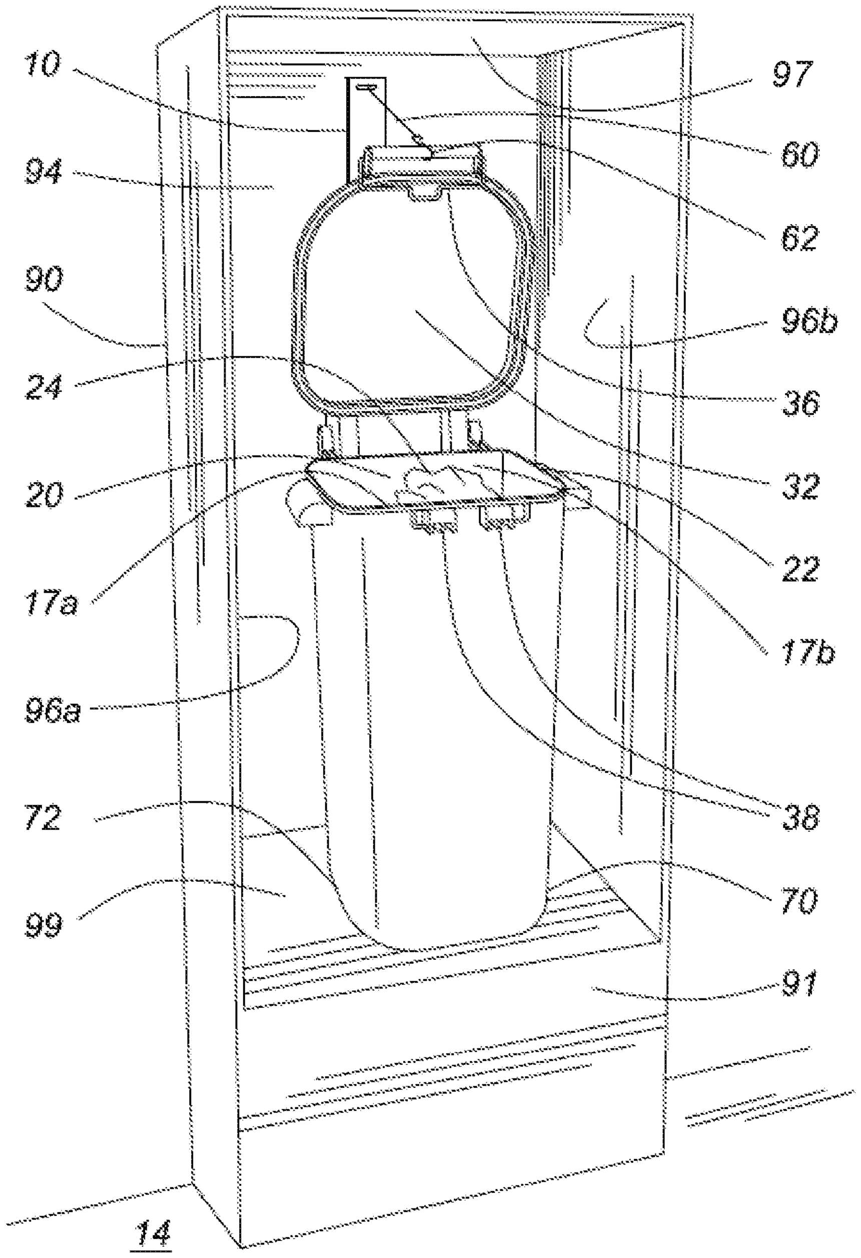
FIG. 4 is a view of a perspective view of a container enclosure, with a lid of the container in an open position.

Secured on flat, elongate mounting plate 40 is tether 60 at end 66, with hook member 62 at other end 64. Hook member 62 is removably attached to lid 32 and holds lid 32 in an angled open position such that a sufficient portion of body opening 22 is accessible for placing refuse 24, as shown in FIG. 4. Maintaining lid 32 in an open position prevents lid 32 from inadvertently closing and falling on a user's hand and/or fingers while placing refuse 24 inside container 12, or disposing of said refuse 24. The length of tether 60 may be varied depending on the desired angle of lid 32 when opened.

Figure 1D:
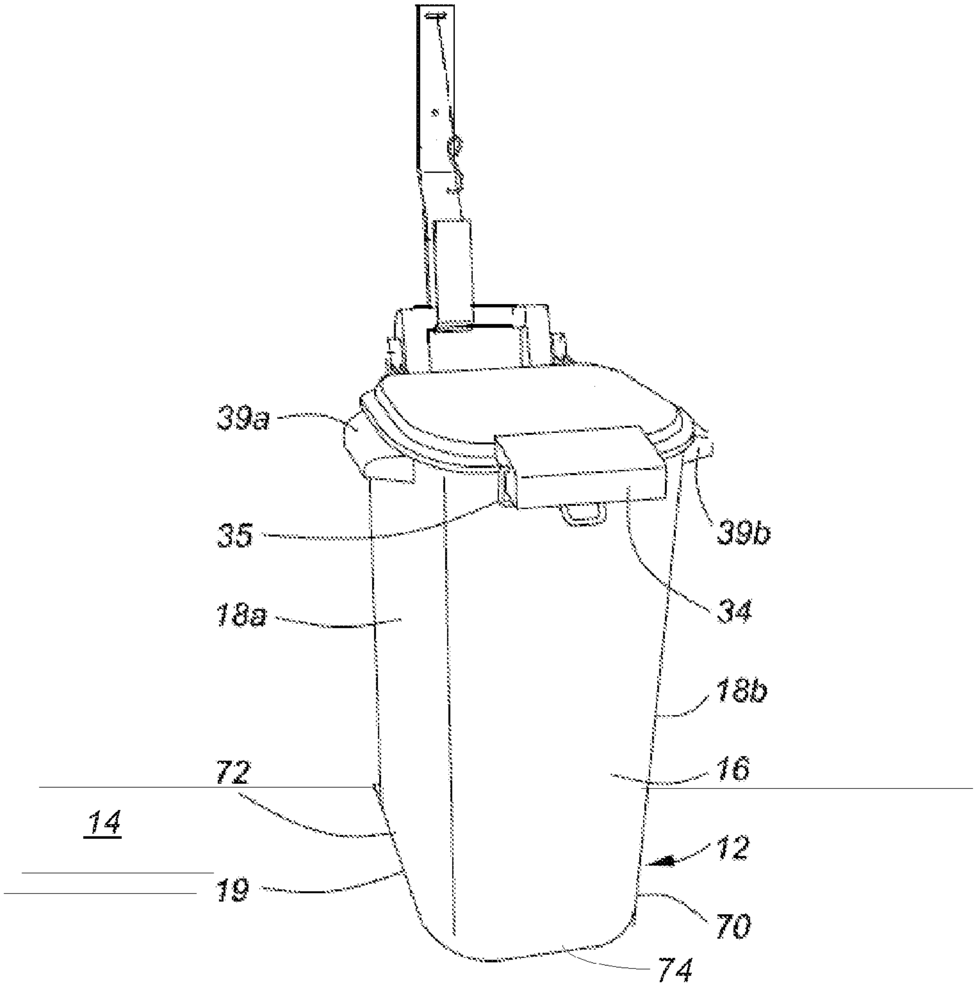
FIG. 1*d* is a perspective view of a retaining device in use with a container, after a force has been applied to one of its sidewalls.

In operation, container 12 is picked up via auxiliary handles 39*a*, 39*b* and handle bar 32 is guided towards retaining device 10, placed above transverse opening 51 between edge 52 of angled second member 48 and first member 44, and introduced into channel 50. Container 12 is then lowered towards surface 14 until handle bar 32 is in close proximity with arcuate portion 46, or abuts arcuate portion 46 and base 19 engages and rests on horizontal surface 14. In the event that force is applied to one of opposed body side walls 18*a* to push container 12, in an effort to topple container 12, edge 72 at base 19 adjacent to side wall 18*a* in contact with horizontal surface 14 is caused to move longitudinally along the horizontal surface 14 until handle support 26 engages edge 53 of arcuate portion 46, while edge 70 at base 19 adjacent to side wall 18*b* travels in the direction of the applied force, as shown in FIG. 1*d*. Once handle support 26 engages edge 53 of arcuate portion 46, continued application of the force has no effect on body 16, and container 12 remains relatively stationary and in an upright position. Even when rocked, container 12 remains in a substantially upright position. Correspondingly, a pushing force applied to other opposing side wall 18*b* with the intention of toppling over container 12 is also thwarted by the engagement of handle support 26 with edge 54 of arcuate portion 46 of retaining device 10.

Alternatively, in the event a force is applied adjacent to lid 32 or container body opening 22 via side wall 18*a* in an effort to pull down container 12, body 16 begins to briefly rotate about edge 72 at base 19 adjacent to side wall 18*a* acting as a pivot. Concurrently, handle support 28 rotates briefly before coming into contact with edge 54 of arcuate portion 46, and handle bar 30 fails to clear edge 52 of angled second arm 48, and therefore remains within channel 50. The engagement of handle support 28 with edge 54 of arcuate portion 46 and the engagement of edge 72 with surface 14 co-operatively arrests the rotational motion of body 16, and thereby maintaining container 12 in a substantially upright position. Once the force is removed, container base 19 returns to its resting position on horizontal surface 14.

Correspondingly, in the event a force is applied adjacent lid 32 or container body opening 22 via side wall 18*b* in an effort to pull down container 12, body 16 begins to briefly rotate about edge 70 at base 19 adjacent to side wall 18*b* acting as a pivot. Concurrently, handle support 26 rotates briefly before coming into contact with edge 53 of arcuate portion 46 of retaining device 10, and edge 70 engages surface 14 to co-operatively inhibit the rotational motion of body 16, and thereby maintaining container 12 in a substantially upright position. Once the force is removed, container base 19 returns to its resting position on horizontal surface 14.

In the event a force is applied adjacent lid 32 or container body opening 22 via front wall 17*a* in an effort to pull down container 12, body 16 attempts to rotate about front edge 74 at base 19, however back wall 17*b* of body 16 or wheels 31 swiftly abut and engage vertical surface 13, thereby inhibiting any further motion, thus maintaining container 12 in a substantially upright position. All the while, handle bar 30 fails to clear edge 52 of angled second arm 48, and therefore remains within channel 50.

Figure 2A:
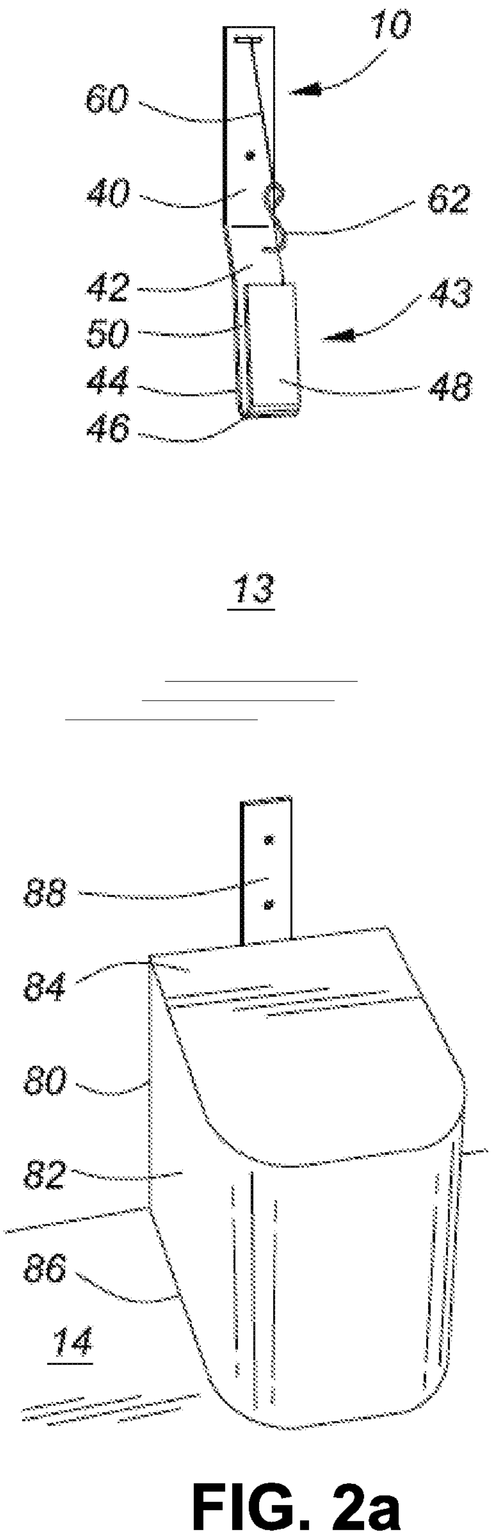
FIG. 2*a* shows a perspective view of a retaining device and a platform.
Figure 2B:
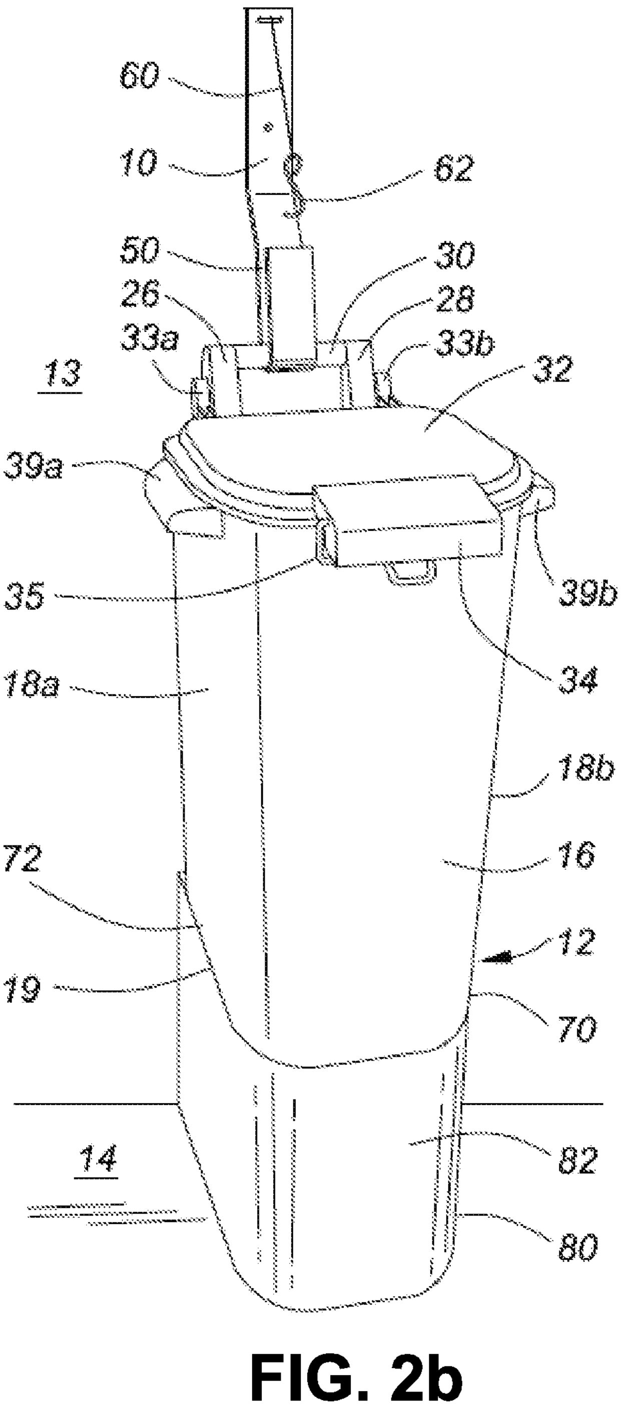
FIG. 2*b* is a perspective view of a container with a lid in a closed position.

Now looking at FIG. 2*a* there is shown retaining device 10 and exemplary platform 80, and FIG. 2*b* shows container 12 secured to retaining device 10 and resting on exemplary platform 80. Generally, platform 80 includes circumferential wall 82 having top surface 84 and bottom surface 86 engaging a substantially horizontal surface 14. The height of top surface 84 above horizontal surface 14 is chosen such that when container 12 is placed on top surface 84, a user standing on horizontal surface 14 can open and close lid 32 without stooping or bending over, thereby reducing the strain on the user's lower back and knees, including possible musculoskeletal injury. Platform 80 comprises a galvanized steel base with a top surface 84 that conforms closely to the shape of container 12 such that raccoons have no ledge to climb on. In addition, top surface 84 is elevated about 14 inches above ground 14, thereby placing container 12 beyond the raccoon's proven anatomical ability to climb into interior volume 20, or climb on another raccoon in order to access interior volume 20. Platform 80 may be secured to horizontal surface 14 or vertical structure 13 such that it remains stationary while in use. For example, platform mounting plate 88 has one portion attached to circumferential wall 82 and another portion secured to vertical structure 13.

Figure 2C:
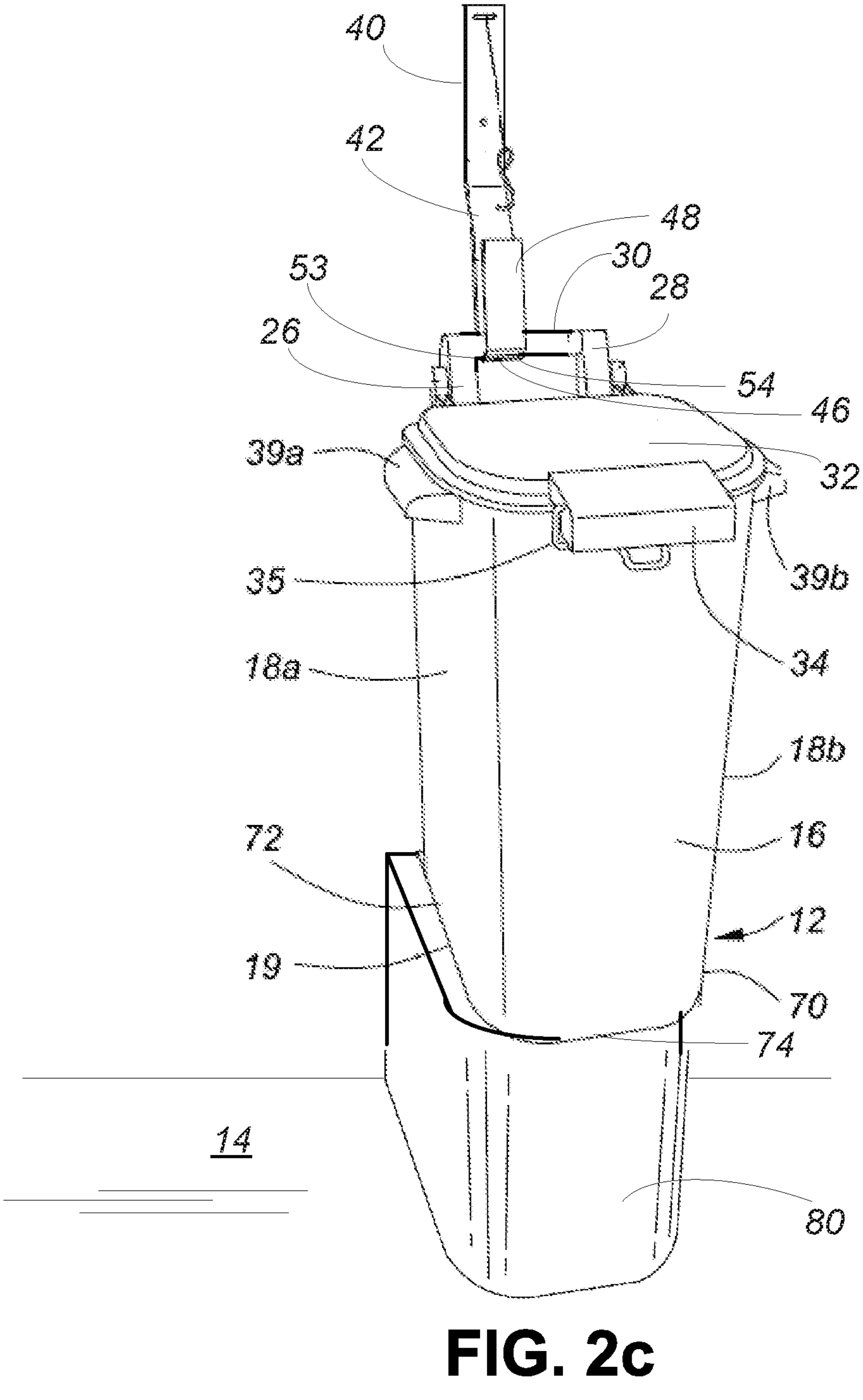
FIG. 2*c* is a perspective view of a container with a lid in a closed position, after a force has been applied to one of its sidewalls.

FIG. 2*c* shows container 12 resting on platform 80, with handle bar 30 residing within channel 50, following an application of a force to sidewall 18*a*. As described above, when a force is applied to one of opposed body side walls 18*a* in an effort to topple container 12, edge 70 of side wall 18*b* in contact with top surface 84 acts as a pivot point, while edge 72 of side wall 18*a* travels away from top surface 84 in a rotational fashion. As body 16 begins to rotate, handle support 26 comes into contact with arcuate portion 46 of retaining device 10, and arrests the rotational motion of handle 30, and therefore that of body 16. Correspondingly, a force is applied to other opposing side wall 18*b* with the intention of toppling over container 12 is also thwarted by the engagement of handle support 28 with arcuate portion 46 of retaining device 10. Once the force is removed, container base 19 returns to its resting position on top surface 84. Accordingly, any force applied to the side wall 18*a* or 18*b*, or front wall 17*a* by an animal or wind, or repeated force to rock container 12, in an effort to release handle 30 from retaining device is curtailed. Accordingly, despite these forces, handle 30 is maintained within channel 50 of retaining device 10, and handle 30 can only be completely removed from channel 50 by lifting container 12 off top surface 84 such that handle 30 travels upwardly to clear edge 52 of second angled arm 48. Once cleared, container 12 is then pivoted away from the retaining device 10 and platform 80, for subsequent placement on the curb for collection, relocation, or cleaning.

Similarly, in the event a force is applied adjacent to lid 32 or container body opening 22 via side wall 18*a* in an effort to pull down container 12, body 16 begins to briefly rotate about edge 72 at base 19 adjacent to side wall 18*a* acting as a pivot, and handle support 28 rotates briefly before coming into contact with edge 54 of arcuate portion 46, and handle bar 30 fails to clear edge 52 of angled second arm 48, and therefore remains within channel 50. Therefore, the engagement of handle support 28 with edge 54 of arcuate portion 46 and the engagement of edge 72 with top surface 84 co-operatively arrests the rotational motion of body 16, thereby maintaining container 12 in a substantially upright position. Once the force is removed, container base 19 returns to its resting position on top surface 84. Correspondingly, when a force is applied adjacent to lid 32, or container body opening 22, via side wall 18*b* in an effort to pull down container 12, body 16 begins to briefly rotate about edge 70 at base 19 adjacent to side wall 18*b* acting as a pivot, and handle support 26 rotates briefly before coming into contact with edge 53 of arcuate portion 46 of retaining device 10, and edge 70 of base 19 engages top surface 84 to co-operatively inhibit the rotational motion of body 16, and thereby maintaining container 12 in a substantially upright position. Once the force is removed, container base 19 returns to its resting position on top surface 84.

In the event a force is applied adjacent to lid 32 or container body opening 22 via front wall 17*a* in an effort to pull down container 12, body 16 attempts to rotate about front edge 74 and back wall 17*b* or wheels 31 abut and engage vertical surface 13, thereby inhibiting any further motion, thus maintaining container 12 in a substantially upright position. All the while, handle bar 30 fails to clear edge 52 of angled second arm 48, and therefore remains within channel 50.

Figure 3:
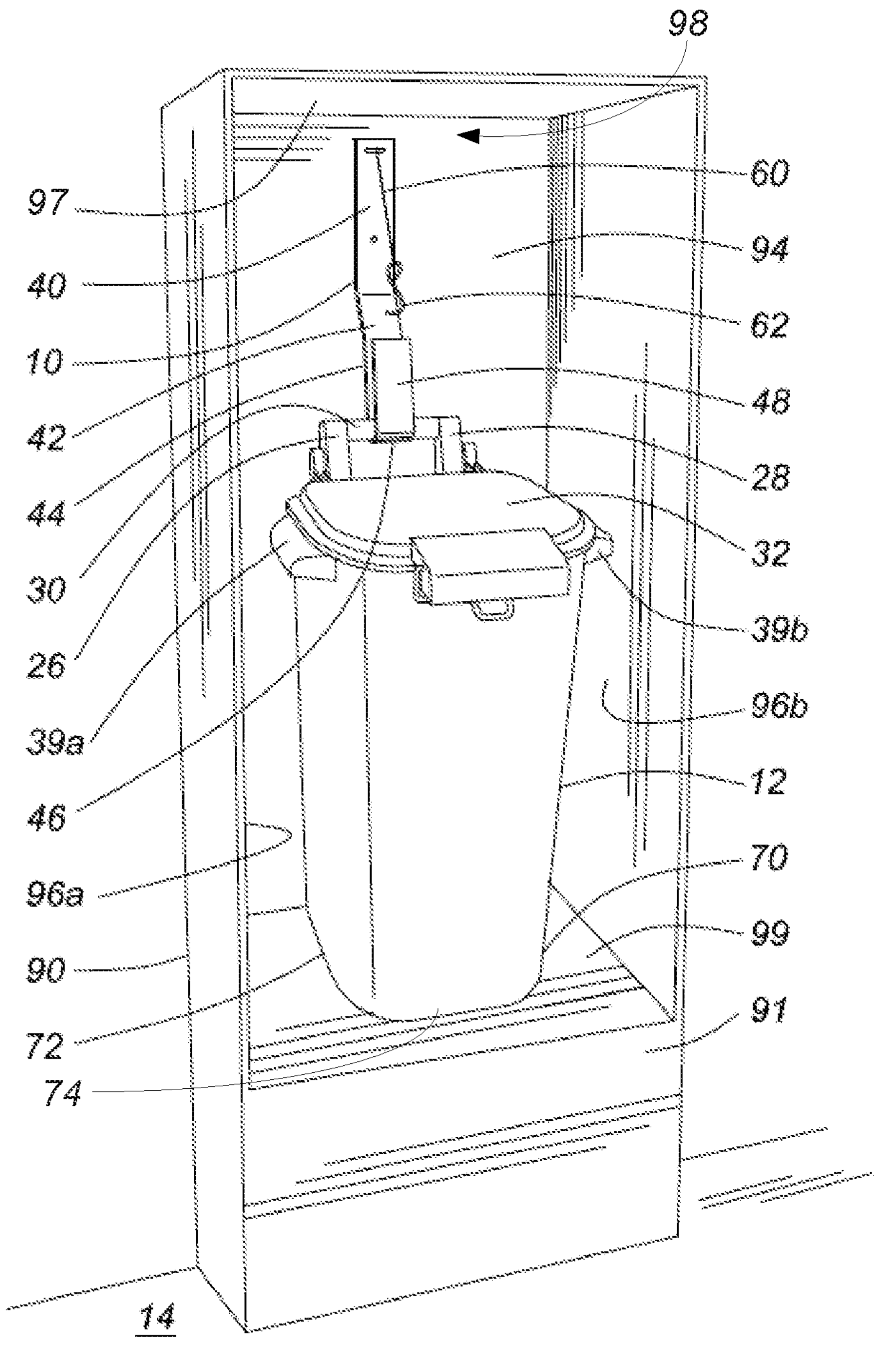
FIG. 3 is a perspective view of a container enclosure, with a lid of the container in a closed position.

As shown in FIG. 3, retaining device 10 is secured by fastening means to housing enclosure 90 resting on horizontal surface 14, such the ground, or elevated on platform 91, similar to platform 80 described above. Housing enclosure 90 comprises back wall 94 separating opposed housing walls 96*a*, 96*b* and top wall 97 to define enclosure opening 98 in front of back wall 94. Container 12 rests on top surface 99 of platform 91, and retaining device 10 receives handle 30 such that container 12 is maintained in a substantially upright position. Platform 92 is secured to horizontal surface 14 or vertical structure 13, such that it remains stationary while in use.

As described above, when a force is applied to one of opposed body side walls 18*a* in an effort to topple container 12, edge 70 of side wall 18*b* in contact with top surface 99 acts as a pivot point, while edge 72 of side wall travels away from top surface 99 in a rotational fashion. As body 16 begins to rotate, handle support 26 comes into contact with arcuate portion 46 of retaining device 10, and arrests the rotational motion of handle 30, and therefore that of body 16. Correspondingly, a force is applied to other opposing side wall 18*a* with the intention of toppling over container 12 is also thwarted by the engagement of handle support 26 with arcuate portion 46 of retaining device 10. Once the force is removed, container base 19 returns to its resting position on top surface 99.

The dimensions of housing enclosure 90, especially the separation distance between opposed housing walls 96*a*, 96*b* is chosen such that the clearance between each of opposed housing walls 96*a*, 96*b* and opposed side walls 18*a* and 18*b* is minimized to prevent access by animals, such as raccoons. However, should an animal manage to gain access to the clearance, the restricted space impedes an animal, such as a raccoon, from having sufficient leverage to apply a force intended to tip over container 12.

In one example, enclosure 90 and platform 91 are constructed from galvanized steel, or other materials able to withstand the environmental effects or inclement weather. Platform 91 conforms closely to the shape of base 19 of container 12 such that raccoons have no ledge to climb on, and platform 91 is elevated about 14 inches above the ground level, thereby placing container 12 beyond a raccoon's proven anatomical ability to climb into interior volume 20, while minimizing stooping by a user, in operation. In exemplary enclosure 90, the depth between enclosure opening 98 and back wall 94 is about 19 inches, while the width of enclosure 90 extending between opposed housing walls 96*a*, 96*b* is about 22 inches, which provides adequate room for securing container 12 to retaining device 10, removing container 12 for placement on the curb, or otherwise. When container 12 is secured to retaining device 10 and resting on platform 91, the spacing between container sidewall 18*a* and housing wall 96*a*, and the spacing between container sidewall 18*b* and housing wall 96*b* is minimized, such as 3 inches, to inhibit ingress of raccoons with intentions of tipping over container 12.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises," "comprising," or any other variations thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

The preceding detailed description of exemplary embodiments of the invention makes reference to the accompanying drawings, which show the exemplary embodiment by way of illustration. While these exemplary embodiments are described in sufficient detail to enable those skilled in the art to practice the invention, it should be understood that other embodiments may be realized and that logical and mechanical changes may be made without departing from the spirit and scope of the invention. For example, the steps recited in any of the method or process claims may be executed in any order and are not limited to the order presented. Further, the present invention may be practiced using one or more servers, as necessary. Thus, the preceding detailed description is presented for purposes of illustration only and not of limitation, and the scope of the invention is defined by the preceding description, and with respect to the attached claims.

The invention claimed is:

1. An enclosure comprising:

a back wall, opposed enclosure side walls having a top end and a bottom end, and a top wall to collectively define an enclosure opening opposite said back wall;

a platform disposed between said top end and said bottom end, said platform for elevating and supporting a container;

a retainer member secured to said back wall for attachment to said container, said retainer member comprising a unitary frame having a flat, elongate mounting plate with a first longitudinal axis in a vertical plane, with an angled segment extending downwardly therefrom with a second longitudinal axis oblique to said first longitudinal axis, a U-shaped segment comprising a first arm with a third longitudinal axis substantially parallel to said first longitudinal axis of said mounting plate, an arcuate portion joining said first arm to a second arm extending upwardly towards said first arm with a fourth longitudinal axis oblique to said third longitudinal axis, whereby an enclosure opening is defined between said first arm, arcuate portion and said second arm; a tether having a hook member at one end and other end secured on said mounting plate; and whereby said enclosure maintains said container in a substantially upright position.

2. The enclosure of claim 1, wherein said container having a substantially rectangular walled body having a front wall facing a back wall, and joined together by opposed body side walls and a base to define an interior volume with a body opening for input of refuse into said interior volume; said body having handle supports and a handle bar extending therebetween and integrally formed therewith; a lid associated with said opening and operable between a closed position and open position, and is pivotably attached to said handle bar via hinge means for access to said interior volume, said lid having a recessed lid handle engageable by a user's hands to provide a lifting force to said lid to swing open said lid about said hinge means, and place said lid in said open position;

wherein a spacing is defined between each of opposed body side walls of said container and each of opposed enclosure side walls of said enclosure;

wherein said enclosure opening is dimensioned to receive said handle bar associated with said container;

wherein said hook member being removably attached to said lid to maintain said lid in an angled open position; and whereby said handle bar is placed within said U-shaped segment and in close proximity to said arcuate portion, and said base engages and rests on said platform to cooperatively resist a force is applied to said body intended to topple said container.

3. The enclosure of claim 2, wherein said spacing is sufficiently dimensioned to facilitate placement of said container in said enclosure and removal of said container from said enclosure via said enclosure opening.

4. The enclosure of claim 3, wherein said spacing is dimensioned to deter animals from gaining access thereinto, and wherein said spacing is dimensioned to restrict animals from gaining sufficient leverage to apply a force to one of said opposed body side walls of said container, in order to tip said container over.

5. The enclosure of claim 4, wherein said platform elevates said container at a height that promotes user ergonomics, and allows a user to open and close said lid via said enclosure opening in a substantially standing posture without substantially stooping and bending over, thereby reducing strain on said user's lower back and knees, and minimizing possible musculoskeletal injury.

6. The enclosure of claim 5, wherein when a force is applied to one of said opposed body side walls of said container in an effort to topple said container via a rotational motion, said handle support comes into contact with said arcuate portion of said retaining device and arrests the rotational motion of handle support, and said base engages said platform to co-operatively inhibit the rotational motion of said walled body, thereby maintaining said container in a substantially upright position.

7. A retaining device, said retaining device comprising:

a unitary frame having:

a flat, elongate mounting plate with a first longitudinal axis in a vertical plane, with an angled segment extending downwardly therefrom, a U-shaped segment with a first arm in a plane substantially parallel to said vertical plane of said mounting segment, an arcuate portion joining first arm to a second arm extending upwardly towards said first arm, whereby an opening is defined between said first arm, arcuate portion and said second arm;

a tether having a hook member at one end and other end secured on said mounting plate; said hook member for attachment to a container and whereby said mounting plate is fixedly attached to a rigid mount;

wherein said opening is dimensioned to receive a handle bar associated with said container, said handle bar disposed between a pair of handle supports integrally formed with said container;

wherein said hook member being removably attached to a lid hingedly connected to said container to adapt said lid between an angled open position and a closed position; and wherein said handle bar is in close proximity to said arcuate portion and a base of said container engages and rests on a substantially horizontal support surface, and said rigid mount is a substantially vertical surface.

8. The retaining device of claim 7, wherein said angled segment extends downwardly from said mounting plate with a second longitudinal axis oblique to said first longitudinal axis, said first arm includes a third longitudinal axis substantially parallel to said first longitudinal axis of said mounting plate, said second arm extends from said arcuate portion upwardly towards said first arm and includes a fourth longitudinal axis oblique to said third longitudinal axis.

9. The retaining device of claim 8, wherein when a force is applied to said container in an effort to topple said container via a rotational motion, one of said pair of handle supports comes into contact with said arcuate portion of said retaining device and arrests the rotational motion of one of said pair of handle supports, and said base engages said horizontal surface to co-operatively inhibit the rotational motion of said container, and said handle is maintained within said U-shaped segment, thereby maintaining said container in a substantially upright position.

10. The retaining device of claim 9, wherein said container is placed on a platform elevated at a predetermined height, such that said base of said container rests on said platform and said handle resides within said U-shaped segment.

11. The retaining device of claim 10, wherein said platform is elevated at a predetermined height to allow a user to open and close said lid via said enclosure opening in a substantially standing posture, to minimize strain on said user's lower back and knees, and minimize possible musculoskeletal injury.

12. The retaining device of claim 11, wherein said mount is an enclosure for receiving said container, said enclosure resting on said support surface, said enclosure comprising a back wall, opposed side walls having a top end and a bottom end, and a top wall to collectively define an enclosure opening opposite said back wall; said platform disposed between said top end and said bottom end and elevated above said support surface, such that said base of said container rests on said platform; and said a retainer member secured to said back wall.

13. The retaining device of claim 12, wherein said tether comprises a predetermined length such that when said hook member is attached to said lid, said lid is held open at a predetermined deposit angle formed between an opening of said container and said hinged lid, wherein said predetermined deposit angle is sufficient to allow introduction of garbage into an interior volume of said container.

14. The retaining device of claim 13, wherein a spacing is defined between each of opposed side walls of said container and each of said opposed side walls of said enclosure, and said spacing is a predetermined dimension selected to inhibit ingress of animals.

15. A retaining system comprising:

a retaining device for removably receiving a handle bar of a refuse container, said retaining device fixedly attached to a rigid mount;

a platform for receiving a base of said container and elevating said container above a support surface;

an enclosure disposed around said container, said enclosure having an enclosure opening to facilitate depositing of said refuse into said container and removal of said container from said retaining device and said enclosure, and placement of said container in said enclosure; and wherein said retaining device comprises a unitary frame having:

a flat, elongate mounting plate in a vertical longitudinal axis, with an angled segment extending downwardly therefrom, a U-shaped segment with a first arm in a plane substantially parallel to said vertical plane of said mounting segment, an arcuate portion joining first arm to a second arm extending upwardly towards said first arm, whereby an opening is defined between said first arm, arcuate portion and said second arm;

a tether having a hook member at one end and other end secured on said mounting segment;

whereby said mounting plate is fixedly attached to said rigid mount; and whereby said refuse container is maintained in a substantially upright position by said retaining system.

16. The retaining system of claim 15, said hook member being removably attached to a lid hingedly connected to said container to adapt said lid between an angled open position and a closed position;

wherein said opening is dimensioned to receive a handle bar associated with said container, said handle bar disposed between a pair of handle supports integrally formed with said container; and wherein said handle bar is in close proximity to said arcuate portion and said base engages and rests on said platform, and wherein when a force is applied to said container in an effort to topple said container via a rotational motion, one of said pair of handle supports comes into contact with said arcuate portion of said retaining device and arrests the rotational motion of one of said pair of handle supports, and said base engages said horizontal surface to co-operatively inhibit the rotational motion of said container, and said handle is maintained with U-shaped segment, thereby maintaining said container in a substantially upright position.

17. The retaining system of claim 16, wherein said platform allows a user to open and close said lid in a substantially standing posture to minimize strain on said user's lower back and knees, and minimize possible musculoskeletal injury.

18. The retaining system of claim 17, wherein said enclosure rests on a support surface, said enclosure comprising a back wall, opposed side walls having a top end and a bottom end, and a top wall to collectively define said enclosure opening opposite said back wall; said platform disposed between said top end and said bottom end and elevated above said support surface, such that said base of said container rests on said platform; and said mounting plate is secured to said back wall, and wherein a spacing is defined between each of opposed side walls of said container and each of said opposed side walls of said enclosure, and said spacing is a predetermined dimension selected to inhibit ingress of animals.

* * * * *